(12) United States Patent
Tobita

(10) Patent No.: US 8,423,601 B2
(45) Date of Patent: Apr. 16, 2013

(54) COMMUNICATION DEVICE, INFORMATION PROCESSING DEVICE, PROGRAM, AND READER/WRITER PROVIDING SYSTEM

(75) Inventor: Naoto Tobita, Tokyo (JP)

(73) Assignee: Felica Networks, Inc., Tokyo (JP)

( * ) Notice: Subject to any disclaimer, the term of this patent is extended or adjusted under 35 U.S.C. 154(b) by 42 days.

(21) Appl. No.: 12/729,401

(22) Filed: Mar. 23, 2010

(65) Prior Publication Data

US 2010/0257224 A1   Oct. 7, 2010

(30) Foreign Application Priority Data

Apr. 2, 2009  (JP) ................................ 2009-089972

(51) Int. Cl.
*G06F 15/16* (2006.01)

(52) U.S. Cl.
USPC .......................................... 709/202; 709/217

(58) Field of Classification Search .................. 709/202, 709/217
See application file for complete search history.

(56) References Cited

U.S. PATENT DOCUMENTS

| | | | |
|---|---|---|---|
| 2003/0120745 A1* | 6/2003 | Katagishi et al. ............. | 709/217 |
| 2004/0060979 A1* | 4/2004 | Sukeda et al. ................ | 235/375 |
| 2007/0152058 A1* | 7/2007 | Yeakley et al. .......... | 235/462.01 |
| 2008/0261653 A1 | 10/2008 | Hara et al. | |
| 2009/0092019 A1* | 4/2009 | Senshu ...................... | 369/53.21 |
| 2012/0254352 A1* | 10/2012 | Ito et al. ........................ | 709/217 |

FOREIGN PATENT DOCUMENTS

| | | |
|---|---|---|
| EP | 0949595 A2 | 10/1999 |
| JP | 2006-085669 | 3/2006 |
| JP | 3133084 | 6/2007 |
| JP | 2007-293572 | 11/2007 |
| JP | 2008-257644 | 10/2008 |
| JP | 2008-262512 | 10/2008 |
| JP | 2008-287335 | 11/2008 |

OTHER PUBLICATIONS

Karnouskos et al., "Mobile Payment: A Journey Through Existing Procedures and Standardization Initiatives", IEEE Communication Surveys & Tutorials, Fourth Quarter, 2004, vol. 6, No. 4, pp. 44-67.
Li, et al., "Secure Mobile Payment via Trusted Computing", IEEE Computer Society, 2008, pp. 98-112.
Smart Card Alliance, "Proximity Mobile Payments: Leveraging NFC and the Contactless Financial Payments Infrastructure", Sep. 2007, pp. 1-39.
European Search Report dated Jul. 8, 2010 corresponding to European Patent Appln. No. 10002426.4.

(Continued)

*Primary Examiner* — Brian P Whipple
(74) *Attorney, Agent, or Firm* — K&L Gates LLP

(57) ABSTRACT

A communication device includes an IC chip storing information in a predetermined area and functioning as a reader/writer that reads out or writes information stored in another IC chip. Also, the communication device downloads an agent from an information processing device connected to the network. Here, the agent is provided as application software operating the IC chip as a reader/writer. Furthermore, the communication device downloads a role from the information device connected to the network using the agent downloaded therefrom, where the role is provided as script data in which part of the contents of processing of the reader/writer performed by the agent.

19 Claims, 17 Drawing Sheets

OTHER PUBLICATIONS

European Search Report issued Sep. 19, 2012 for corresponding European Appln. No. 12005325.1.

"Proximity Mobile Payments: Leveraging NFC and the Contactless Financial Payments Infrastructure", Smart Card Alliance, Sep. 2007, Princeton Junction, NJ.

European Office Action issued Jul. 12, 2012, corresponding to European Appln. No. 10002426.4.

Notice of reasons for refusal issued in connection with Japanese Patent Application No. 2009-089972, dated Feb. 5, 2013. (2 pages).

* cited by examiner

FIG. 5 https://p2ce.itmo.jp/role/?f=1&r=00000001&d=20090101100&c=10&i=spid000001&s=1680d74fa30fc9d4bedc&v=01

FIG. 6

| ITEM NAME | PARAMETER NAME | INDISPENSABLE | DESCRIPTION |
|---|---|---|---|
| ROLE DISTRIBUTION URL FORMAT VERSION | f = | ○ | VERSION THAT REPRESENTS THE PARAMETER OF ROLE DISTRIBUTION URL; "1" AT FIRST RELEASE |
| ROLE ID | r = | ○ | ID OF ROLE DATA PREPARED BY SERVICE PROVIDER |
| EXPIRATION DATE | d = | — | EXPIRATION DATE AND HOUR OF ROLE DISTRIBUTION URL |
| ALLOWABLE NUMBER OF TIMES OF USE | c = | ○ | ALLOWABLE NUMBER OF TIMES OF USE OF ROLE DISTRIBUTION URL |
| ROLE DISTRIBUTION ID | i = | — | ID USED BY SERVICE PROVIDER |
| SIGNATURE VALUE | s = | ○ | SIGNATURE VALUE OF URL |
| SIGNATURE KEY VERSION | v = | ○ | VERSION NUMBER OF SIGNATURE VALUE KEY |

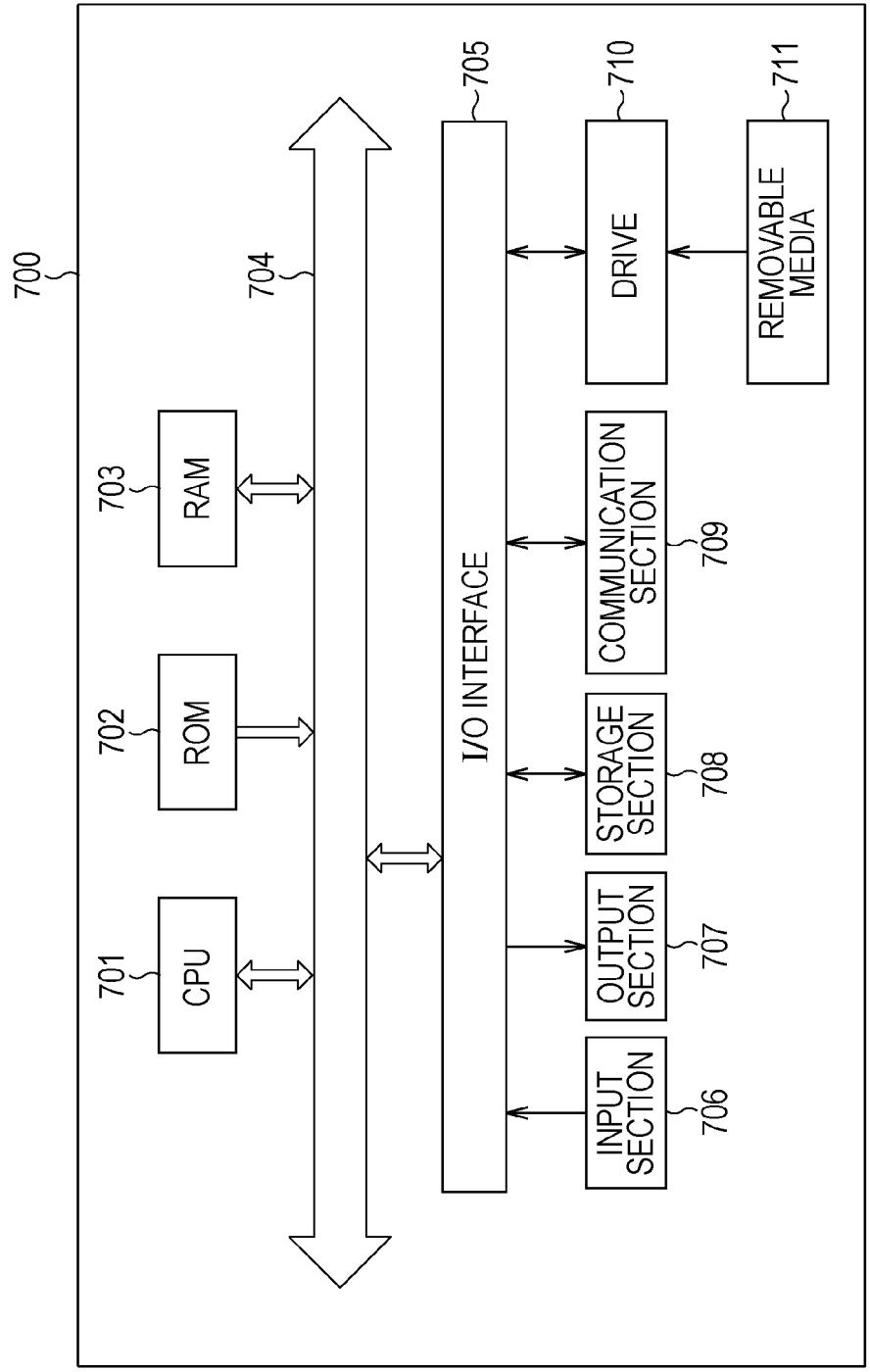

COMMUNICATION DEVICE, INFORMATION PROCESSING DEVICE, PROGRAM, AND READER/WRITER PROVIDING SYSTEM

CROSS REFERENCES TO RELATED APPLICATIONS

The present application claims priority to that disclosed in Japanese Priority Patent Application JP 2009-089972 filed in the Japan Patent Office on Apr. 2, 2009, the entire content of which is hereby incorporated by reference.

BACKGROUND

The present application relates to a communication device, an information processing device, a program, and a reader/writer providing system. In particular, the present invention relates to a communication device, an information processing device, a program, and a reader/writer providing system, which are able to provide a reader/writer for processing each of various kinds of data stored in an IC chip.

Information communication terminals, such as cell phones and cards, in which information-stored IC chips are embedded, have been widely used for carrying out non-contact wireless communication with reader/writer (R/W) terminals. For example, the information communication terminals embedding such IC chips have been widely used for processing at ticket gates of transportation systems, transactions at cash registers and credit card payments in retail stores, time management of employees, and so on.

Such contactless IC chips may be independently used for multiple applications, for example one IC chip may be used for a commuter ticket, electronic money, point service, and so on. Thus, the contactless IC chip is featured so that a memory region thereof is divided into a plurality of storage areas which are assigned to the respective applications, providing the IC chip with a function of managing the data. In order to perform the interoperation between applications safely, the contactless IC chip is also featured to eliminate undesired accesses of applications other than those managing the respective storage areas.

For instance, an information processing terminal, such as a cell phone, provided with an IC chip may include applications A and B to which the storage areas A and B are assigned. Each of these storage areas is protected by password authentication to make it inaccessible to unauthorized personnel. The application A is provided with password A to the recording area A. The application B is provided with password B to the recording area B.

In some cases, two or more applications seek to obtain the permission of access to the date of an individual storage area managed by another application to share the data between the applications.

Then, a technology was proposed in which simple procedures make it possible to share authentication information, such as a password, being set to the storage area of the IC chip, between the administrator application of the storage area and the non-administrator application (see, for example, Japanese Patent Laying-Open No. 2008-287335.

SUMMARY

In the typical procedures, different kinds of application software have been installed for reader/writer terminals that correspond to the respective storage areas.

In consideration of the foregoing, therefore, it is desired to easily provide a reader/writer for processing each of various kinds of data stored in an IC chip.

A first embodiment is a communication device that includes: an IC chip storing information in a predetermined area and functioning as a reader/writer that reads out or writes information stored in another IC chip; a unit for downloading an agent from an information processing device connected to the network, where the agent is provided as an application software operating the IC chip as a reader/writer; and a unit for downloading a role from the information device connected to the network using the agent downloaded therefrom, where the role is provided as script data in which part of the contents of processing of the reader/writer performed by the agent.

The communication device may further include: a unit for acquiring URL provided for accessing the information processing device to download the role, wherein the URL includes parameters described therein and used in processing of determining whether the information processing device allows the communication device to download the role.

The communication device may further include a unit for transmitting a request for acquiring a role-download activation page to the information processing device based on the URL. In this communication device, on the basis of information included in the request for acquiring the role-download activation page, a GUI screen may be displaced based on display data of the role-download activation page transmitted from the information processing device when the information processing device allows the communication device to download the role. In this communication device, furthermore, the agent may be activated to allow the means for downloading the role to download the role when the link in the GUI screen is operated.

Here, in the above communication device, the unit for downloading the role may download a plurality of roles. Among these roles, a role selected by the user may be activated together with the activation of the agent to allow the IC chip to perform processing of the reader/writer.

The communication device may further include a unit for activating the agent, when the agent is activated to allow the IC chip to perform the processing of the reader/writer, transmitting predetermined check information to the information processing device connected to the network and activating the agent based on a check result transmitting from the information processing device; and, a unit for activating the agent, when the role is activated to allow the IC chip to perform the processing of the reader/writer, which transmits predetermined check information to the information processing device connected to the network and activating the role based on a check result transmitted from the information processing device.

Here, the predetermined check information to be transmitted to the information processing device by the unit for activating the agent may include an identification number particular to the IC chip.

The IC chip may be functioned as a reader/writer that performs reading or writing of information stored in another IC chip placed in another communication device.

According to the first embodiment, there is provided a program that operates a computer as a communication device. Here, the communication device includes an IC chip storing information in a predetermined area and functioning as a reader/writer that reads out or writes information stored in another IC chip, a unit for downloading an agent from an information processing device connected to the network, where the agent is provided as an application software operating the IC chip as a reader/writer, and a unit for downloading a role from the information device connected to the network by activating the agent downloaded therefrom, where the role is provided as script data in which part of processing of the reader/writer performed by the agent.

According to the first embodiment, an agent is downloaded from an information processing device connected to the network. Here, the agent is provided as application software operating the IC chip as a reader/writer. In addition, a role is downloaded from the information device connected to the network by activating the agent downloaded therefrom. Here, the role is provided as script data in which part of processing of the reader/writer performed by the agent.

A second embodiment is an information processing device that includes the following units: First, a unit is provided for transmitting a role-download activation page. This unit transmits display data of the role-download activation page to a communication device on the basis of a request for acquiring the role-download activation page transmitted through the network from the communication device. Here, the communication device includes an IC chip storing information in a predetermined area and functioning as a reader/writer that reads out or writes information stored in another IC chip. In addition, the communication device allows the IC chip to be functioned as the reader/writer based on a role provided as a script data in which part of contents of processing is described. Another unit is provided for transmitting the role to the communication device when receiving an access from the communication device based on a link in the role-download activation page.

The request for acquiring the role-download activation page may be transmitted based on URL previously acquired by the communication device to download the role. Also, the unit for transmitting the role-download activation page may generate a download key and transmit the display data of the role-download activation page including the download key when the communication device is allowed to download the role based on the description of a parameter in the URL.

When receiving an access from the communication device based on a link in the role-download activation page, the unit for transmitting the role may transmit the role to the communication device on condition that it is determined that the communication device is allowed to download the role based on predetermined check information transmitted from the communication device.

The predetermined check information transmitted from the communication device may include: agent identification information provided as application software that allows the IC chip to be functioned as a reader/writer in the communication device; and the download key.

The information processing device further includes a unit for transmitting an agent check result and a unit for transferring a role check result. Here, when activating the agent to allow the IC chip to perform processing of the reader/writer by the IC chip, the unit for transmitting an agent check result generates a check, result that represents whether the communication device is allowed to activate the agent and transmits the check result to the communication device based on predetermined check information transmitted from the communication device. In this information processing device, furthermore, when activating the role to allow the IC chip to perform processing of the reader/writer by the IC chip, the unit for transferring a role check result generates a check result that represents whether the communication device is allowed to activate the role and transmits the check result to the communication device based on predetermined check information transmitted from the communication device.

The unit for transmitting the agent check result may determine whether the communication device is allowed to activate the agent based on the identification number particular to the IC chip in the predetermined check information.

A second embodiment is a program that operates a computer as an information processing device that includes the following units: First, a unit is provided for transmitting a role-download activation page. This unit transmits display data of the role-download activation page to a communication device on the basis of a request for acquiring the role-download activation page transmitted through the network from the communication device. Here, the communication device includes an IC chip storing information in a predetermined area and functioning as a reader/writer that reads out or writes information stored in another IC chip. In addition, the communication device allows the IC chip to be functioned as the reader/writer based on a role provided as a script data in which part of contents of processing is described. Another unit is provided for transmitting the role to the communication device when receiving an access from the communication device based on a link in the role-download activation page.

According to the second embodiment, from a communication device that allows the IC chip to be functioned as the reader/writer based on a role provided as a script data in which part of contents of processing is described, display data of the role-download activation page is transmitted to the communication device based on a request for acquiring as the role-download activation page transmitted through the network. In addition, the role is transmitted to the communication device when receiving an access from the communication device based on a link in the role-download activation page.

A third embodiment is a read/write providing system with an information processing device. Here, the information processing device includes: a communication device and an information processing device. The communication device includes an IC chip storing information in a predetermined area and functioning as a reader/writer that reads out or writes information stored in another IC chip. The communication device also includes a unit for downloading an agent from an information processing device connected to the network, where the agent is provided as application software operating the IC chip as a reader/writer. The communication device further includes a unit for downloading a role from the information device connected to the network using the agent downloaded therefrom, where the role is provided as script data in which part of the contents of processing of the reader/writer performed by the agent. The information processing device includes the following units: First, a unit is provided for transmitting a role-download activation page transmits display data of the role-download activation page to the communication device on the basis of a request for acquiring the role-download activation page transmitted through the network from the communication device. Furthermore, another unit is provided for transmitting the role to the communication device when receiving an access from the communication device based on a link in the role-download activation page.

According to the third embodiment, the information processing device may transmit display data of the role-download activation page to the communication device based on a request for acquiring as the role-download activation page transmitted from the communication device through the network. In addition, the role is transmitted from the information processing device to the communication device when receiving an access from the communication device based on a link in the role-download activation page.

According to any of the embodiments, a reader/writer for processing each of various kinds of data stored in an IC chip can be simply provided.

Additional features and advantages are described herein, and will be apparent from the following Detailed Description and the figures.

BRIEF DESCRIPTION OF THE FIGURES

FIG. 5 is a diagram illustrating an example of role-distribution URL.

FIG. 6 is a diagram illustrating exemplary parameters in the role distribution URL.

FIG. 19 is a block diagram showing an exemplary configuration of a personal computer.

DETAILED DESCRIPTION

The present application will be described with reference to the attached drawings according to an embodiment.

First, an item providing system according to an embodiment will be described with reference to FIG. 1.

Figure 1:
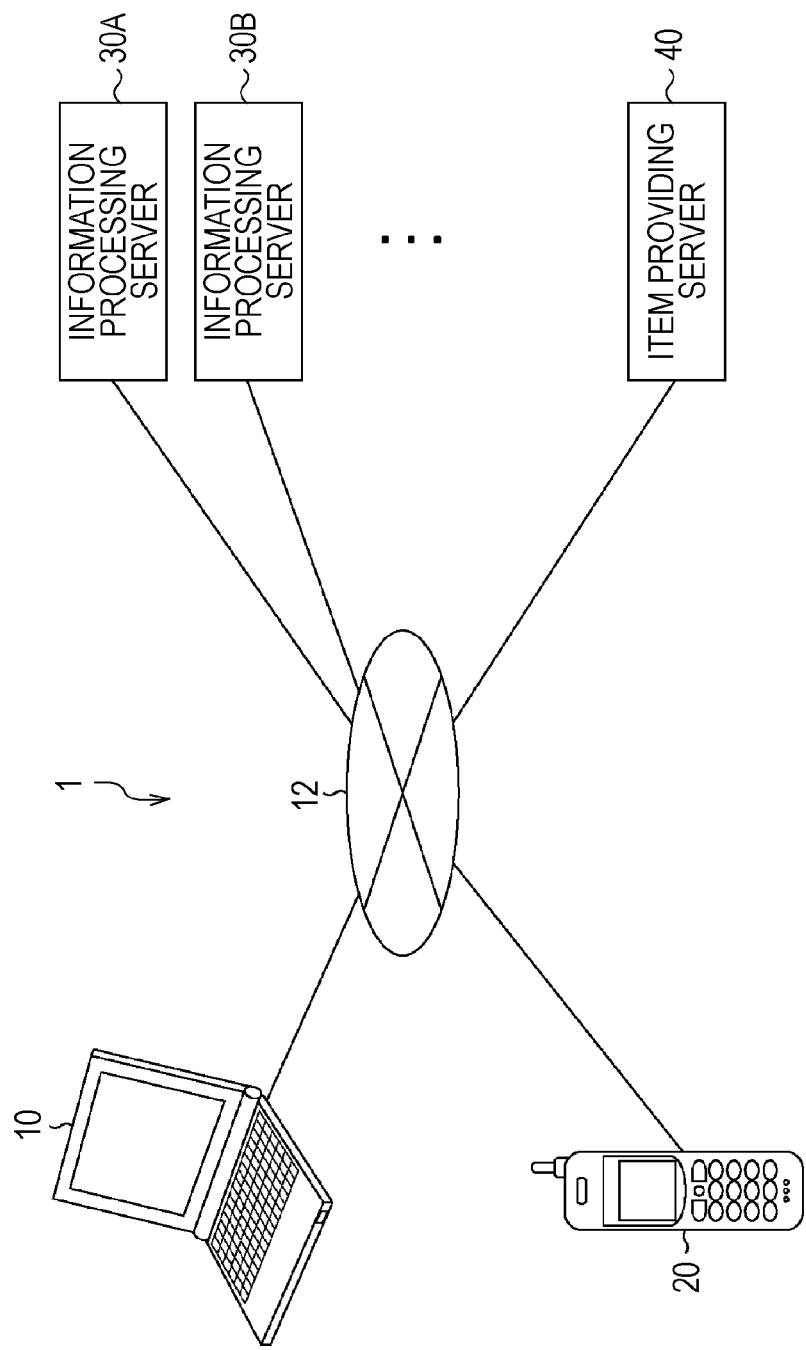
FIG. 1 is a diagram illustrating an exemplary configuration of the item providing system.

In FIG. 1, an exemplary configuration of the item providing system 1 is illustrated. As shown in the figure, the item providing system 1 includes a personal computer (PC) 10, a cell phone 20, a PC information processing server 30A, a cell-phone information processing server 30B, and an item providing server 40.

The PC 10, cell phone 20, information processing server 30A, information processing server 30B, and item providing server 40 are connected to one another through a network 12. The network 12 may also include a transmission line, such as a wired cable or a wireless electric wave, or a data relay machine, such as a router or a communication-control station. For example, the cell phone 20 is connected to the network 12 via the base station that performs communications by wireless electric waves and so on.

The information processing server 30A is provided for communication with the PC 10, while the information processing server 30B is provided for communication with the cell phone 20. However, if it is not necessary to distinguish between them, hereinafter these servers 30A and 30B will be simply referred to as information processing servers 30. The information processing server 30 has a function of transmitting first data to the PC 10 or the cell phone 20 and may be installed in any carrier.

The item providing server 40 communicates with the cell phone 20 and then generates an item specified by the first data received from the cell phone 20, followed by supplying the item to the cell phone 20. Examples of the item include a ticket, a coupon, a membership card, a point card, a stamp card, and an admission card. Thus, in the item providing system 1, the first data for item generation is supplied from the information processing servers 30 to the PC 10 or the cell phone but only the item providing server 40 can generate the item to be supplied to the cell phone 20.

In FIG. 1, the PC 10 and the cell phone 20 are represented as examples of the communication devices and only provided for illustrative purposes. Alternatively, the communication device may be any of information processing devices, such as a portable music player, a portable video processing device, a personal digital assistance (PDA), a home game machine, a portable game machine, and a household electrical appliance.

Figure 2:
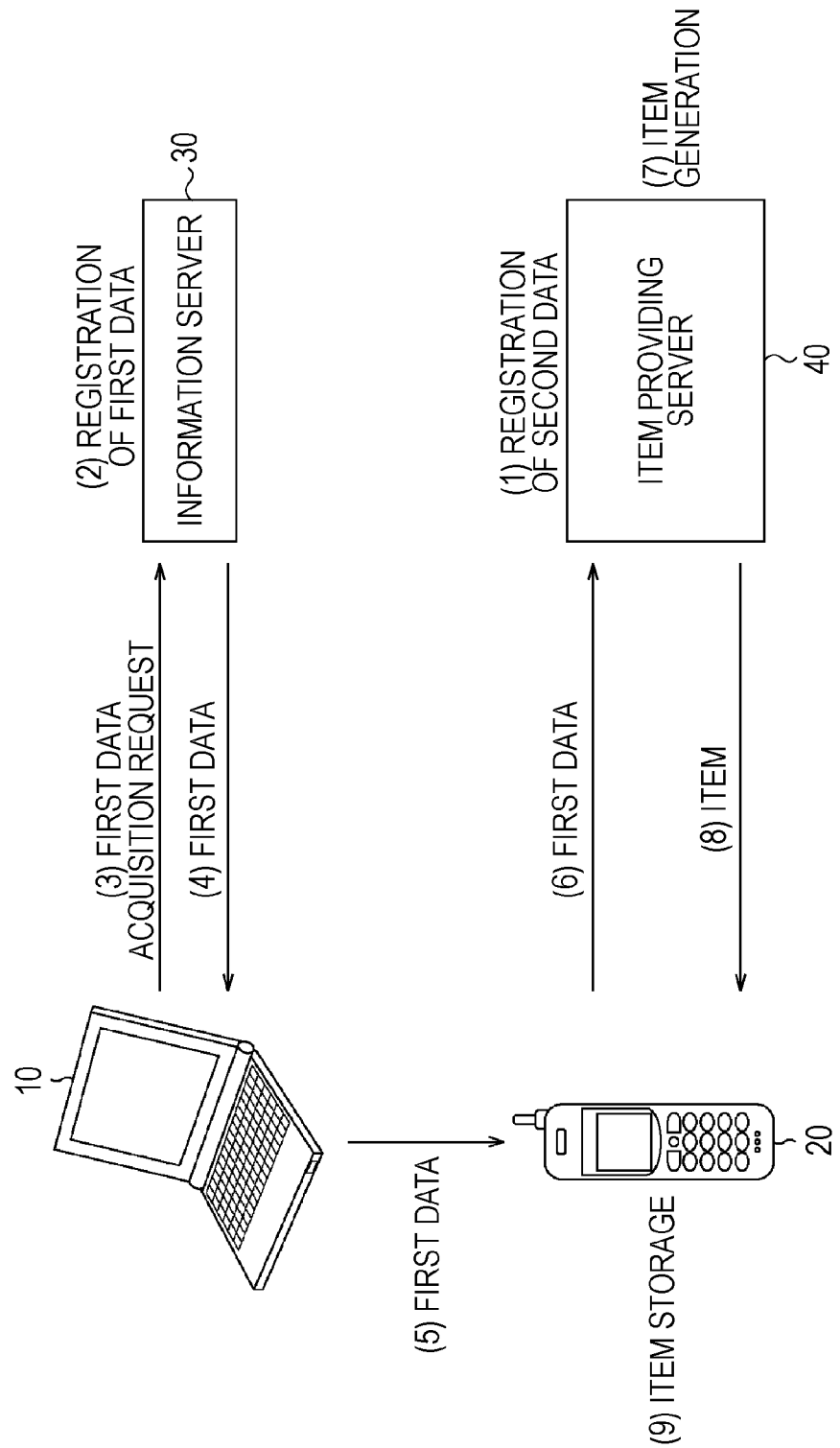
FIG. 2 is a diagram illustrating transmission of various kinds of data in the item providing system shown in FIG. 1.

In the item providing system 1, for example, various kinds of data can be processed and then sent and received along the flows represented by the respective arrows in FIG. 2. Specifically, second data is registered into the item providing server 40 (first step) and the first data is then registered into the information processing server 30 (second step). The first data includes intrinsic data to be used in an IC chip placed in the cell phone 20, which is capable of performing contactless communication, and data representing the corresponding second data Subsequently, if the PC 10 desires the acquisition of the first data from the information processing server 30 (third step), then the information processing sever 30 transmits the first data requested from the PC 10 (fourth step). Here, the PC 10 may receive the first data via mail or may also receive a quick response code (QR) representing the first data.

Furthermore, if the cell phone 20 receives the first data from the PC 10 using any communication interface (fifth step), then the cell phone 20 transmits the acquired first data to the item providing server 40 (sixth step). Therefore, the item providing server 40 generates an item including the second data corresponding to the first data received from the cell phone 20 and the intrinsic data included in the first data (seventh step).

Subsequently, the item providing server 40 transmits the generated item to the cell phone 20 (eighth step), then the cell phone 20 stores the item received from the item providing server 40 (ninth step). The item is stored in a predetermined storage area which has been defined in advance on the IC chip of the cell phone 20.

The user owning the cell phone 20 with the item-stored IC chip can use the item by holding the cell phone 20 over a reader/writer. For example, if the item stored in the IC chip of the cell phone 20 is a concert ticket, then the user holds the cell phone 20 over the reader/writer at the entrance of the concert hall to be admitted to the concert hall.

The present embodiment allows a cell phone or the like to be functioned as a reader/writer which can read/write the data about such an item. In other words, the data about the item stored in the IC chip of the cell phone 20 can be read or updated by the functions of a noncontact communication IC chip placed in another cell phone which is similar to the cell phone 20.

Figure 3:
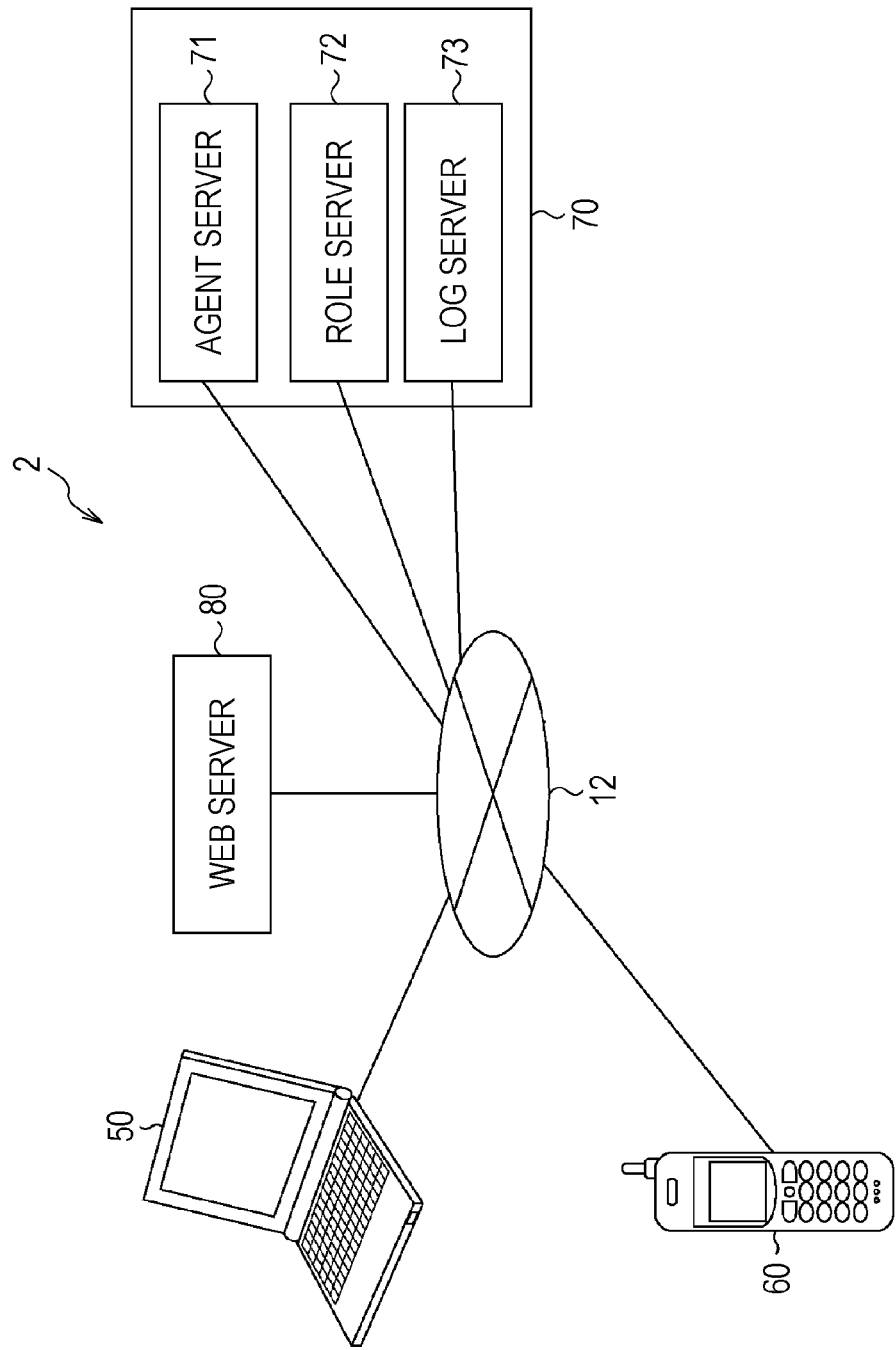
FIG. 3 is a diagram illustrating a reader/writer providing system according to an embodiment.

Referring now to FIG. 3, a reader/writer providing system 2 according to the embodiment of the present invention will be descried.

As shown in the figure, the reader/writer providing system 2 includes a personal computer (PC) 50, a cell phone 60, an agent server 71, a role server 72, and log server 73, and a WEB server 80. For example, the agent server 71, the role server 72, and the log server 73 are installed on a data center 70 of an administrative agent in the reader/writer providing system 2 and managed by the administrative agent.

Each of the PC 50, the cell phone 60, the agent server 71, the role server 72, the log server 73, and the Web server 80 are connected to one another through the network 12. In a manner similar to FIG. 1, the network 12 may include a transmission line, such as a wired cable or a wireless electric wave, or a data relay machine, such as a router or a communication-control station. For example, the cellular phone 60 may be connected to the network 12 via the base station that communicates using wireless electric waves.

Basically, the agent server 71, the role server 72, and the log server 73 may be integrated into a single server. Here, in order to simplify the description, the agent server 71, the role server 72, and the log server 73 will be described as discrete servers, respectively.

Like the cell phone 20 shown in FIG. 1, the cell phone 60 is provided with an IC chip which is capable of performing contactless communication. The IC chip performs contactless communication with another IC chip and is provided with reader/writer to read out data stored in another IC chip and is implemented with reader/writer functions such as those for reading out and updating the data stored in the another IC chip. For allowing the user to use the reader/writer functions, an application program called an agent may be installed on the cell phone 60. That is, for example, the user can operate the agent-installed cell phone 60 as a reader/writer by predetermined key operation.

In addition, the agent is designed as a general-purpose application program for using the reader/writer function and customizable by script data called a role. In other words, the user may further install various kinds of script data on the agent-installed cell phone 60 to set up the arbitrary operation or the like of the cell phone 60 after reading the data about an item. Under such a configuration, the cell phone 60 can read out or update the item data stored in the IC chip of the cell phone 20 by being close to the cell phone 60.

For example, the cell phone 60 operated on the basis of a certain role reads out a ticket item issued by a certain event promoter. If the validity of the ticket is authenticated, then an image or a sound is output to admit the user. In addition, the cell phone 60 operated on the basis of another role reads out a point card item issued by a certain service provider. If the validity of the point card is authenticated, then the cell phone 60 performs the process of addition or reduction of points is performed on the point card and displays the result of the process. Alternatively, the role may include the image or sound data as described above in addition to the script data. In addition, for example, the description of the role script may be modified to allow the cell phone 60 to upload the log data for the item processing to the data center 70.

The agent server 71 transmits an agent to the cell phone 60 in response to a request from the cell phone 60 to allow the cell phone 60 to download the agent. In addition, the role server 72 transmits a role to the cell phone 60 in response to a request from the cell phone 60 to allow the cell phone 60 to download the role. Two or more roles may be generated to allow the cellular phone 60 to download these roles. The log server 73 receives log data updated by the cell pone 60 on the basis of the description of the role script and then stores the log data.

The PC 50 may be, for example, one owned by a service provider. Here, the service provider may be, for example, a provider who provides an item to the cell pone 20. In addition, for example, the cell phone 60 may be one owned by one of the members of the provider.

For example, if the item stored in the IC chip of the cell phone 20 is a concert ticket, then the service provider may be an event promoter or the like. In this case, the cell phone 60 may be held by the staff of the event promoter who has charge of the admission reception.

Furthermore, for example, if the item stored in the IC chip of the cell phone 20 is a cleaning coupon, then the service provider may be the head office of cleaning chain stores. In this case, the cell phone 60 is held by a salesclerk who performs business, such as reception, at one of the chain stores.

The service providing agent generates a role using the PC 50. The role may be, for example, script data described as a document written in Extensible Markup Language (XML) or the like. Thus, the role can include the data of an image to be displayed on a display of the cell phone 60 and the data of sound to be output from a speaker of the cell phone 60. Furthermore, if the cell phone 60 intends to act as a reader/writer, then the role may include the Uniform Resource Locator (URL) of the server on the Internet in which the information to be referred is held, or the like.

In this way, for example, the cell phone 60 can automatically display or output any of predetermined images, textual information, sounds, and so on when the item data stored in the IC chip of the cell phone 20 is read out.

The service provider has signed the predetermined contract with the administrative agent of the reader/write providing system 2. Thus, the service provider may upload the generated role to the role server 72 of the data center 70. Subsequently, the service provider describes the URL for download of the role data stored in the role server 72 on the Web server 80 managed by a provider or the like under an agreement with the service provider itself.

The cell phone 60 held by the member of the service provider uses a communication function to access the Web server 80 via the net work 12 and acquires the URL from the Web server 80. The member of the service provide is previously notified of the address information or the like of the Web page on which the URL. Then, the cell phone 60 downloads from the role server 72 the role data generated and uploaded by the service provider using the PC 50.

Figure 4:
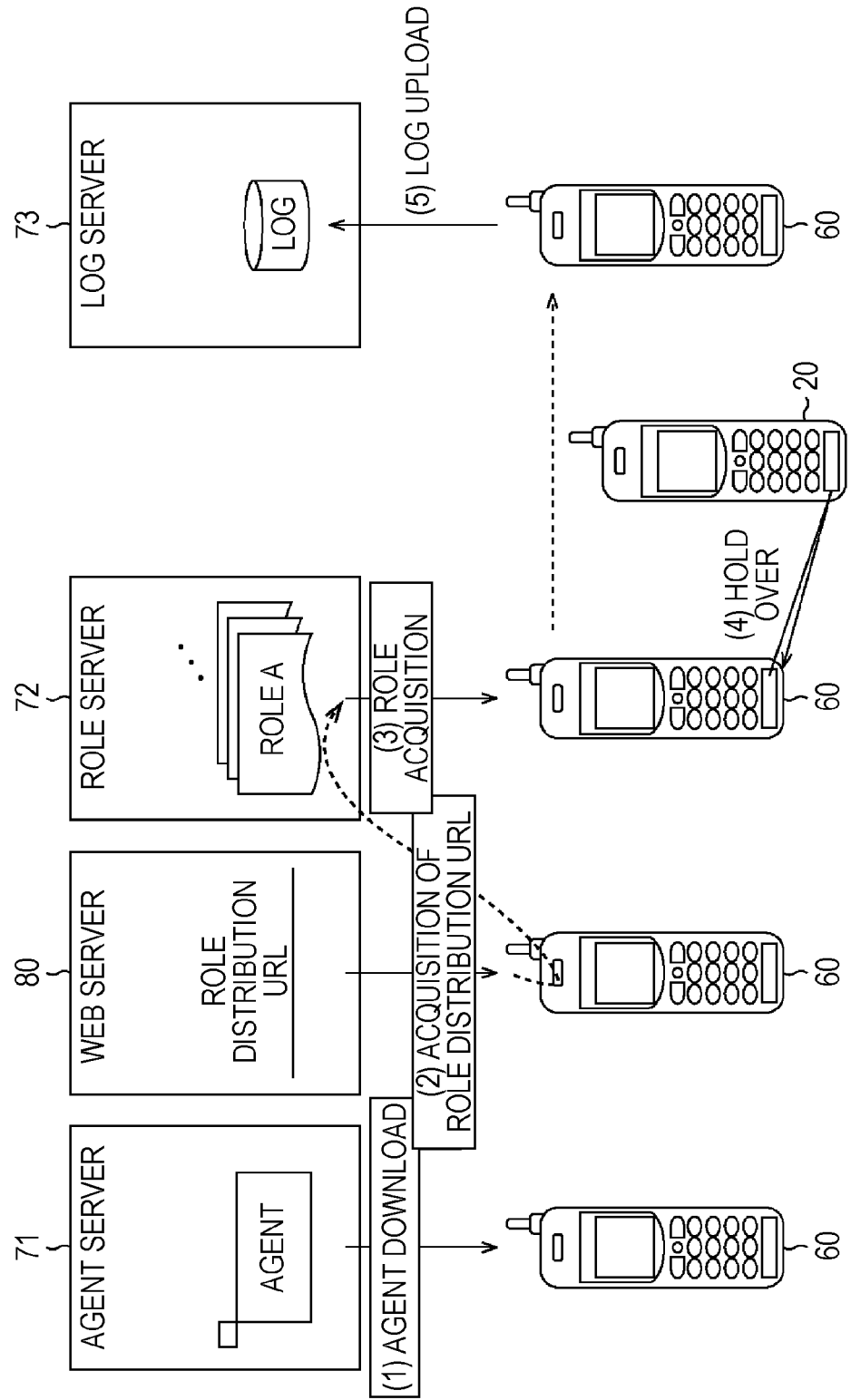
FIG. 4 is a diagram illustrating transmission of various kinds of data in the reader/writer providing system shown in FIG. 3.

In the reader/writer providing system 2, for example, various kinds of data can be sent and received along the flows represented by the respective arrows in FIG. 4. First, the cell phone 60 downloads an agent from the agent server 71 (first step). Then, the cellular phone 60 starts the browser installed beforehand and accesses the Web server 80 to acquire the role-distribution URL (second step). The cell phone 60 executes the acquired role-distribution URL to download the role data from the role server 72 (third step).

Furthermore, the user may click the role-distribution URL on the browser of the cell phone 60 to automatically access the role server 72. At this time, if the role server 72 executes a predetermined checking process and permits the download of the role, then the role server 72 transmits the data for displaying a role-download activation page to the cell phone 60. FIG. 5 is a diagram illustrating an example of the role-distribution URL and FIG. 6 is a diagram illustrating exemplary parameters in the role-distribution URL.

In the role-distribution URL shown in FIG. 5, the portion, "https://p2ce.itmo.jp/role/", is the information that specifies the address of the role server 72 on the network. In the role-distribution URL shown in FIG. 5, the portion, "?f=1&r00000001&d=2009010100&c=10&i=spid00001&s=1680d74fa30fc9d4bedc&v=01", is the information that represents parameters used for the checking process in the role server 72. Namely, the characters of "f", "r", "d", and so on represent the parameters, respectively. Following each of these characters, "=" followed by numerical values and characters is described.

As shown in FIG. 6, the parameter "f" described on the aforementioned role-distribution URL is the information representing the version of the parameters described in the role-distribution URL. In this example, the number of the version is "1". Alternatively, the number of the version may be set to "2" and a revised role-distribution URL with new parameters which are not shown in FIG. 5 may be generated.

The parameter "r" described in the role-distribution URL is the ID that specifies the role data corresponding to the role-distribution URL. The role server 72 specifies the data of the role to be downloaded on the cell phone 60.

Furthermore, the parameter "d" described in the role-distribution URL is the information representing the expiration date of the role-distribution URL, where the expiration date is represented by "year", "month", "day", and "hour". In the example shown in FIG. 5, the described expiration date is "2009010100". Thus, it represents 0.00 a.m. on Jan. 1, 2009. In this case, therefore, if the role server 72 has received an access that specifies the role-distribution URL after 0.00 a.m. on Jan. 1, 2009, then it is judged that there is the access after the expiration date and the download of the role is unallowable.

Alternatively, the parameter "d" may be not described in the role-distribution URL.

Furthermore, the parameter c described in the role-distribution URL is the information representing the number of available uses (downloads) of the role corresponding to the role-distribution URL. The role server 72 counts the number of downloads of the role by the agent of the cell phone 60 on a case-by-case basis. If it exceeds the number of the available downloads, then the download of the road is disallowed.

Furthermore, the parameter "i" described in the role-distribution URL is the original ID used by the service provider. Alternatively, the parameter "i" may not be described in the role-distribution URL.

In addition, the parameter "s" described in the role-distribution URL is the information representing the signature value of the service provider. The role-distribution URL is previously provided with the digital signature of the service provider under an agreement with the administrative agent of the reader/writer providing system 2. The signature of the service provider can be confirmed by decoding the signature value using a predetermined key.

The parameter "v" described in the role-distribution URL is the information that specifies the version of the key corresponding to the signature value of the parameter "s".

The role server 72 specifies the key based on the information of the parameter "v" and then decodes the signature value of the parameter "s" using such a key. If the value obtained as a result of the decoding is different from one previously registered, then the role server 72 determines that the value is not a valid signature value and the download of the role is unavailable.

Thus, on the basis the parameters described in the role-distribution URL, the role data can be specified and the checking process for determining whether the download of the role is allowed can be carried out. If the download of the role is allowed, then the role server generates a download key representing that the permission of download has been already checked and transmits the display data of the role-download activation page to the cell phone 60. The display data of the role-download activation page includes the information about a link mentioned later and the link information includes the download key.

Referring back to FIG. 4, as descried above, as a result of the access based on the role-distribution URL, the display data of the role-download activation page is transmitted to the cellular phone 60 from the role server. The user may operate the GUI or the like of the role-download activation page displayed on the browser of the cellular phone 60 to start the agent of the cell phone 60. As a result, the role of interest can be downloaded from the role server 72 to the cell phone 60.

Figure 7:
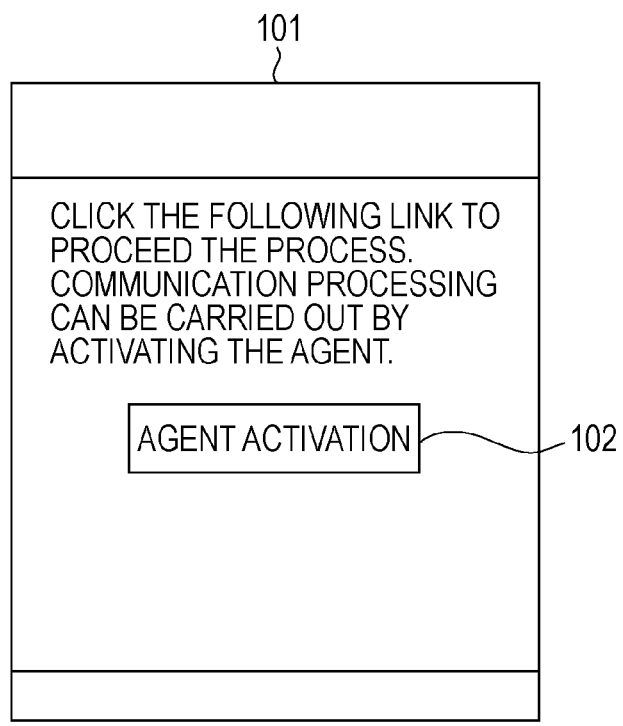
FIG. 7 is a diagram illustrating an example of the role download activation page.

FIG. 7 is a diagram illustrating an example of the role download activation page.

This figure represents the example of the role download activation page displayed as a screen 101 on the display of the cell phone 60. On the screen 101, the messages of "Click the following link to advance the process" and "Communication processing can be carried out by activating the agent" are described.

The user of the cell phone 60 may click the link 102 where the message of "Agent activation" according to the instructions described on the screen 101 of FIG. 7. As a result, the agent, which has been previously downloaded on the cell phone 60, is activated to start communication with the role server 72. At this role, the role server 72 executes the predetermined checking process to start the download when the download of the role is allowed.

In this case, the role server 72 determines whether the role download key is valid. If the role download key is valid, then the download is allowed. The role download key may be generated as a predetermined numerical value or the like and stored in a predetermined storage area of the role server 72 when the display data of the role-download activation page is generated. If the link 102 is clicked, then the download key in the link 102 is transmitted to the role server 72. For example, if the download key is not stored in the predetermined storage area, then it is determined that the role download key is not valid. In addition, if the download key is the used one or the expired one, then it is also determined that the role download key is not valid.

In addition, if the role server 72 determines that the agent that demands the role download is valid after the determination thereof, then the download is allowed. If the cell phone 60 downloads the agent, then the ID that specifies the download is generated by the agent server 71 and transmitted to the role server 72 while being transmitted to the cell phone 60. Hereinafter, the ID will be referred to the agent ID. The agent ID is stored in the predetermined storage area of the role server 72 while being stored in a predetermined storage area of the memory or the like of the cell phone 60.

The agent activated in the cell phone 60 can transmit the agent ID when communicating with the role server 72. Subsequently, the role server 72 determines that the agent ID is valid when the agent ID, which is transmitted from the cell phone 60, is not stored in the predetermined storage area. In addition, the information about suspended use of the agent may be stored corresponding to the agent ID. Thus, it is possible to determine that the agent ID is invalid when the agent ID transmitted from the cell phone 60 is provided with the information about suspension of use.

Referring back to FIG. 4, the cell phone 60 with the downloaded role activates the agent and allows the agent to execute the downloaded role. Thus, the cell phone 60 can be operated as a reader/writer. In the case of downloading two or more roles, any of roles may be previously determined as one to be executed by the agent.

Subsequently, the cell phone 20 with the item-stored IC chip is held over the cell phone 60 (fourth step). Here, the cell phone 60 serves as a reader/writer, so that the item-stored IC chip can be held over (closed to) the reader/writer. Therefore, the cell phone 60 reads out the item and performs the predetermined processing thereon. For example, the process of displaying an image, outputting a sound, or the like that represents the admission to the concert hall is carried out.

The cell phone 60 uploads the log data about the result of the process to the log server 73 based on the description of the role. For example, the information that specifies the IC chip on which the processed item has been stored, the processing date, the information about the validity of admission depending on the IC chip, or the like can be updated as log data (fifth step).

Furthermore, the upload of the log data is only executed when the uploaded of the log data is described by the role. In other words, the upload of the log data may be cancelled as long as the service provider does not consider the practical use of the log data or the like.

In the reader/writer providing system 2 according to the present embodiment, therefore, a reader/writer which can be operated depending on items can be provided without developing and installing any software for reader/writer terminal on a case-by-case basis.

Figure 8:
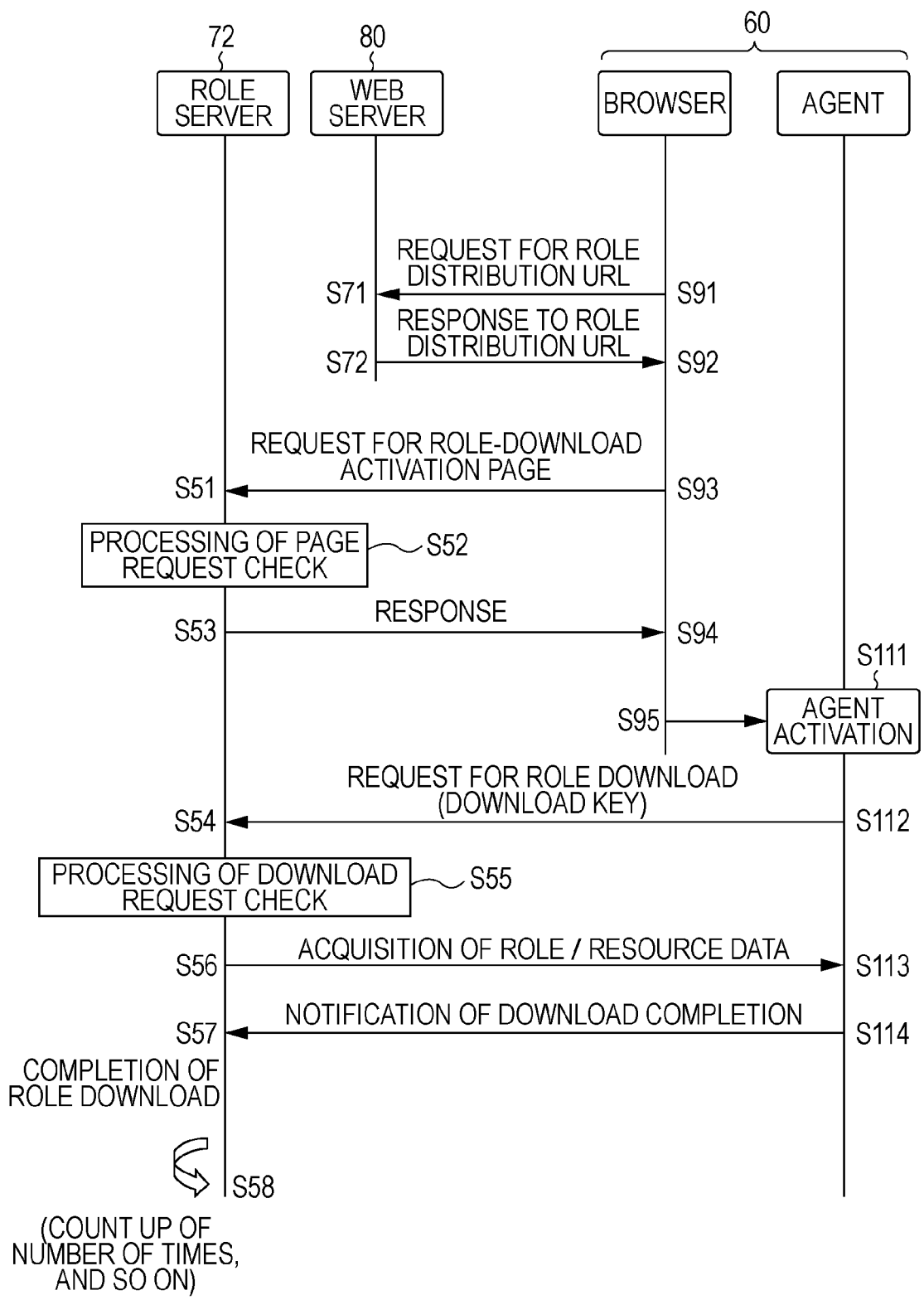
FIG. 8 is a flow chart that illustrates the flow of a process for downloading a role.

FIG. 8 is a flow chart that illustrates the flow of a process for downloading a role. This figure illustrates the process from allowing the cell phone 60 to accesses the Web server 80 by starting up the browser to downloading the data of a role from the role server 72.

In step S91 in the figure, the browser of the cell phone 60 transmits a request for acquiring the role-distribution URL to the Web server 80. In step S71, the Web server 80 receives the transmitted role. The request for acquiring the role-distribution URL may be carried out, for example, before the update in step S91 based on the acquired role selection page displayed by the browser. For example, the user of the cell phone 60 may access to the Web server 80 by activating the browser to display a role-selection page on the screen of the cell phone. Then, the user may operate the GUI or the like of the role-selection page to select the role to be downloaded. As a result, the request of acquiring the role-distribution URL including the role ID of the role or the like is generated and then transmitted to the Web serer 80.

In step S72, the Web server 80 transmits the response of the role distribution URL to the cell phone 60 in response to the request of acquiring the role-distribution URL received in step S71. Therefore, in step S92, for example, the browser of the cell phone 60 acquires the role-distribution URL as described above with reference to FIG. 5.

In step 93, the browser of the cell phone 60 accesses the role server 72 based on the role-distribution URL acquired in step S92 and the access thereof is received in step S51. This access is performed as a request for acquiring a role-download activation page to the role server 72. For example, the access is executed on the role server 72 when the user clicks the role-distribution URL displayed on the screen of the cell phone 60. As a result, the role server 72 acquires each of the parameters described above with reference to FIG. 6.

Figure 9:
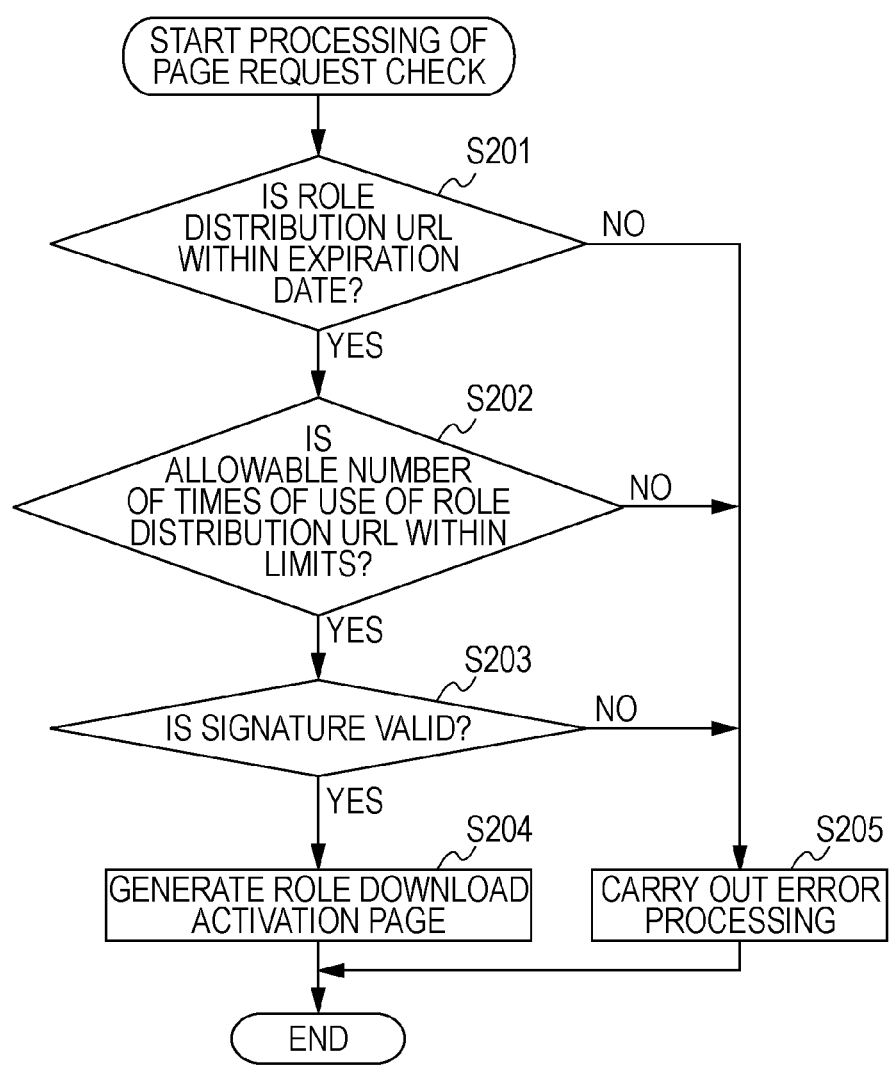
FIG. 9 is a flow chart that illustrates an example of processing of page request check.

In step S52, the role server 72 executes a process of checking a page request as described later with reference to FIG. 9.

Here, an example of the process of page request check in step S52 in FIG. 8 will be described with reference to the flow chart shown in FIG. 9.

In step S201, the role server 72 determines whether the present time is within an expiration date of the role distribution. At this time, as described above with reference to FIG. 6, it is checked whether the present time is within the expiration date based on the parameter "d" described in the role-distribution URL. In step S201, if it is determined that the present time is within the expiration date, then the process proceeds to step S202.

In step S202, the role server 72 determines whether the number of times of use of the role-distribution URL is within limits. At this time, as descried above, it is confirmed whether the number of times of use exceeds a predetermined number based on the parameter "c" described in the role-distribution URL. In step S202, if it is determined that the number of times of use is within limits, then the process proceeds to step S203.

In step 203, the role server 72 determines whether the signature is valid. At this time, as described above, the signature value of the parameter "s" described in the role-distribution URL is decoded using a key specified by the parameter "v" and the validity of the signature is then confirmed. In step 203, if the validity of the signature is confirmed, then the process proceeds to step S204.

Furthermore, if the process proceeds to step S204, it is determined that the download of the role should be allowed.

In step 204, the role server 72 generates the display data of a role-download activation page. As described above, the display data of the role-download activation page includes the link information in which a download key is placed.

On the other hand, if it is determined that the role-distribution URL has expired in step S201, it is determined that the number of times of use is out of limits in step S202, or it is determined that the signature is invalid in step 203, then the process proceeds to step S205.

Furthermore, if the process proceeds to step S205, then it is determined that the download of the role should not be allowed.

In step S205, the role server 72 carries out error processing. At this time, for example, the role server 72 generates data for displaying a notice that the acquisition of the role-download activation page has failed on the browser of the cell phone 60.

Thus, the processing of page request check is performed.

Referring back to FIG. 8, after the process in step S52, the role server 72 transmits a reply to the request of the role-download activation page to the cell phone 60. Then, the reply is received by the browser of the cell phone 60 in step S94. In the processing in step S52, if it is determined that the download of the role should be allowed, then the processing in step 53 allows the role server 72 to transmit the display data of the role-download activation page to the cell phone 60. In addition, in the processing in step S52, if it is determined that the download of the role should not be allowed, then the processing in step S53 allows the role server 72 to transmit display data or the like for displaying a notice about the failed acquisition of the role-download activation page to the cell phone 60. If the acquisition of the role-download activation page has failed, then the processing shown in FIG. 8 is terminated here.

The role-download activation page received in step S94 may be, for example, one on the screen 101 shown in FIG. 7. In other words, FIG. 7 illustrates an example of the GUI screen displayed on the display of the cell phone 60 based on the display data of the role-download activation page transmitted by the processing in step S53. In step S95, if the link 102 in the screen 101 shown in FIG. 7 is clicked, then the agent of the cell phone 60 is activated in step S111.

In step S112, the agent of the cell phone 60 transmits a role-download request to the role server 72. Then, in step S54, the role server 72 receives the request. The role-download request includes a request for the download key in the link 102 shown in FIG. 7.

Figure 10:
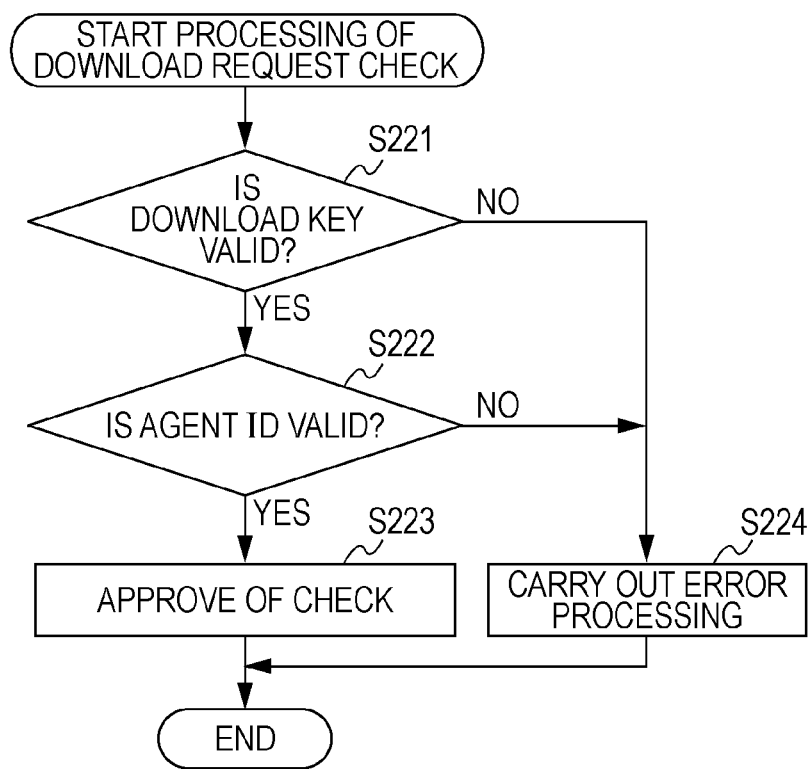
FIG. 10 is a flow chart that illustrates an example of processing of download request check.

In step S55, the role server 72 executes the processing of download request check as described later with reference to FIG. 10.

Referring now to the flow chart shown in FIG. 10, an example of the processing of download request check in step S55 in FIG. 8 will be described in detail.

In step S221, the role server 72 determines whether the download key is valid. At this time, for example, if the download key transmitted to the cell phone 60 corresponds to one stored in the predetermined storage area of the role server, then it is determined that the role download key is valid. Furthermore, for example, it may be also determined whether the download key has been already used or whether it has expired.

In step S221, if it is determined that the download key is valid, then the process proceeds to step S222.

In step S222, the role server 72 determines whether the agent ID is valid. At this time, for example, if the agent ID transmitted from the cell phone 60 is not stored in the predetermined storage area of the role server 72, then it is determined that the agent ID is invalid. Alternatively, the information about suspended use of the agent may be stored corresponding to the agent ID and may be checked together with the agent ID.

In step S222, if it is determined that the agent ID is valid, then the process proceeds to step S223.

Furthermore, if the process proceeds to step S223, then it is determined that the download of the role should be approved.

In step S223, the role server 72 sets a flag representing that the check results in permission is set to "ON". Therefore, the activation of role download is allowed.

On the other hand, if it is determined that the download key is invalid in step S221 or it is determined that the agent ID is invalid in step S222, then the process proceeds to step S224.

In step S224, the role server 72 performs error processing. At this time, for example, the role server 72 generates data for displaying a notice that the role download is not allowed on the browser of the cell phone 60.

Thus, the processing of download request check is performed.

Referring back to FIG. 8, if the flag representing that the check results in permission is set to "ON" as a result of the processing in step S55, then the data transmission from the role server 72 to the cell phone 60 is performed. On the other hand, if the flag representing that the check results in permission is not set to "ON", then the data for displaying a notice that the role download is not allowed or the like is generated and the processing shown in FIG. 8 is terminated here.

In step 113, the agent of the cell phone 60 receives the data transmitted from the role server 72. Therefore, the role download is allowed.

If download of a role is completed, the agent of the cell phone 60 transmits a notification of download completion to the role server 72 in step S114. Then, in step S57, the role server 72 receives the notification.

In step S57, the role server 72 completes the processing of role data transmission. Then, in step S58, the number of downloads is counted up.

In the predetermined storage region of the role server 72, the number of role downloads is stored. For example, the number of downloads is stored for each of the role IDs and agent IDs. In step S58, the role server 72 counts up the number of downloads corresponding to the role ID of the transmitted role and the number of downloads corresponding to the agent ID of the cell phone 60 from which the download request has been transmitted.

Thus, the process for role download is performed.

Therefore, for example, the reader/writer which can correspond to each of the items stored in the IC chip of the cell phone 20 can be simply provided. In other words, it is not necessary to develop and install application software corresponding to each of the items stored in the IC chip of the cell phone 20 on the reader/writer terminal.

Subsequently, the cell phone 60 that has acquired the agent and the role as described above can be suitably used as a reader/writer. For example, the user is allowed to bring the cell phone 60 which has acquired the agent and the role into a shop, a concert hall, or the like and to be used as a reader/writer. In this case, the user of the cell phone 60 operates the cell phone 60 to activate the agent and then activate the role.

Here, when the agent is activated, the cell phone 60 communicates with the agent server 71 and the agent is then activated on the basis of the result of the predetermined check processing by the agent server 71.

In addition, when the role is activated, the cell phone 60 communicates with the role server 72. Then, the role server 72 activates the role based on the result of the predetermined check processing.

Referring now to the flow chart shown in FIG. 11, the processing carried out by the cell phone 60 when used as a reader/writer will be described.

In step S231, the browser of the cell phone 60 determines whether the activation of the agent is ordered and standby until it is determined that the activation of the agent has been ordered. In step S231, if it is determined that the activation of the agent is ordered, then the process proceeds to step S232.

In step S232, the browser of the cell phone 60 transmits a check request including an agent ID, IDm, time information, and agent's version information to the agent server 71.

Here, the "IDm" is discrimination information particular to the IC chip of the cell phone 60 and can be read out of the IC chip. The time information is information that represents the current time clocked by the cell phone 60. The agent's version information is information acquired with the download of the agent.

In Step S233, the browser of cellular phone 60 receives the check of the result received by the agent server corresponding to the check request transmitted by the processing in step S232.

In step 234, the browser of the cell phone 60 determines whether the result of the check received by the processing in step S233 is "OK" (representing that the activation of the agent is allowed). In step S234, if it is determined that the result of the check is "OK", then the process proceeds to S235. On the other hand, in step S234, if it is determined that the result of the check is not "OK", then the process proceeds to step S241.

In step S235, the browser of the cell phone 60 activates the agent.

In step S236, the agent of the cell phone 60 determines whether the activation of the role is ordered and standby until it is determined that the activation of the agent has been ordered. In step S236, if it is determined that the activation of the role is ordered, then the process proceeds to step S237.

In step S237, the browser of the cell phone 60 transmits a check request including a role ID, the role's version information, and time information to the role server 72.

The role's version information is information acquired with the download of the role.

In Step S238, the browser of cellular phone 60 receives the check of the result received by the role server corresponding to the check request transmitted by the processing in step S237.

In step 239, the browser of the cell phone 60 determines whether the result of the check received by the processing in step S238 is "OK" (representing that the activation of the role is allowed). In step S239, if it is determined that the result of the check is "OK", then the process proceeds to S240. On the other hand, in step S239, if it is determined that the result of the check is not "OK", then the process proceeds to step S241.

In step S240, the agent of the cell phone 60 activates the role.

On the other hand, in step S241, the browser or the agent of the cell phone 60 performs error processing. In this case, for example, the process of displaying a message or the like of notifying that the activation of the agent or role is not allowed on the screen of the cell pone 60.

Referring now to the flow chart of FIG. 12, the processing of agent activation check will be described. Here, the processing is the predetermined check-processing performed at the time of activating the agent. For activating the agent, this processing is carried out by the agent server 71 that receives the data of check request transmitted from the cell phone 60 by the processing in step S232 in FIG. 11.

In step S251, the agent server 71 determines whether the agent ID is valid. For example, if the agent ID in the data transmitted from the cell phone 60 corresponds to the agent ID generated from the agent server 71 in the past, then it is determined that the agent ID is valid.

If it is determined that the agent ID is valid in step S251, then the process proceeds to step S252. In step S251, if it is determined that the agent ID is invalid, then the process proceeds to step S256.

In step S252, the agent server 71 determines whether the IDm is valid. Here, the IDm is discrimination information particular to the IC chip of the cell phone 60 and is the ID provided by the manufacturer of the IC chip, including data transmitted from the cell phone 60. The IDm notified from the manufacturer of the IC chip in advance is stored in the agent server 71. For example, if the IDm in the data transmitted from the cell phone 60 corresponds to the IDm stored in the predetermined storage area of the agent server 71, then it is determined that the IDm is valid. In other words, it is determined that the IC chip of the cell phone 60 is valid.

In step S252, if it is determined that the IDm is valid, then the process proceeds to step S253. On the other hand, if it is determined that the IDm is invalid in step S252, then the process proceeds to step S256.

In step S253, the agent server 71 determines whether the time setting is valid. At this time, for example, it is determined whether the time information in the data transmitted from the cell phone 60 is shifted from the time information output from a timer of the agent server 71. For instance, if the difference between the two kinds of the time information is within a threshold range, then it is determined that the time setting is valid. In other words, it is confirmed whether the time setting of the cell phone 60 is incorrect. For example, since the reader/writer may desire the process of confirming the expiration date of the item, any item may not be correctly processed when the time setting of the cell phone 60 is incorrect.

In step S253, if it is determined that the time setting is valid, then the process proceeds to step S254. On the other hand, if it is determined that the time setting is invalid in step S253, then the process proceeds to step S256.

In step S254, the agent server 71 determines whether the version is valid. At this time, for example, the agent's version information in the data transmitted from the cell phone 60 is confirmed, contained at this time, for example, data transmitted from cellular phone 60, is checked out to determine whether the version is valid. If it is determined that the version is valid in step S254, then the process proceeds to step S255. On the other hand, if it is determined that the version is invalid in step S254, then the process proceeds to step S256.

In step S255, the agent server 71 transmits the information representing the check's result "OK" to the cell phone 60. The cell phone 60 that has received the information is allowed to activate the agent.

On the other hand, if the process proceeds step S256, then the activation of the agent is not allowed. In step S256, the agent server 71 carries out error processing. At this time, for example, the role server 72 generates data for displaying a notice that the activation of the agent is not allowed on the browser of the cell phone 60.

Figure 11:
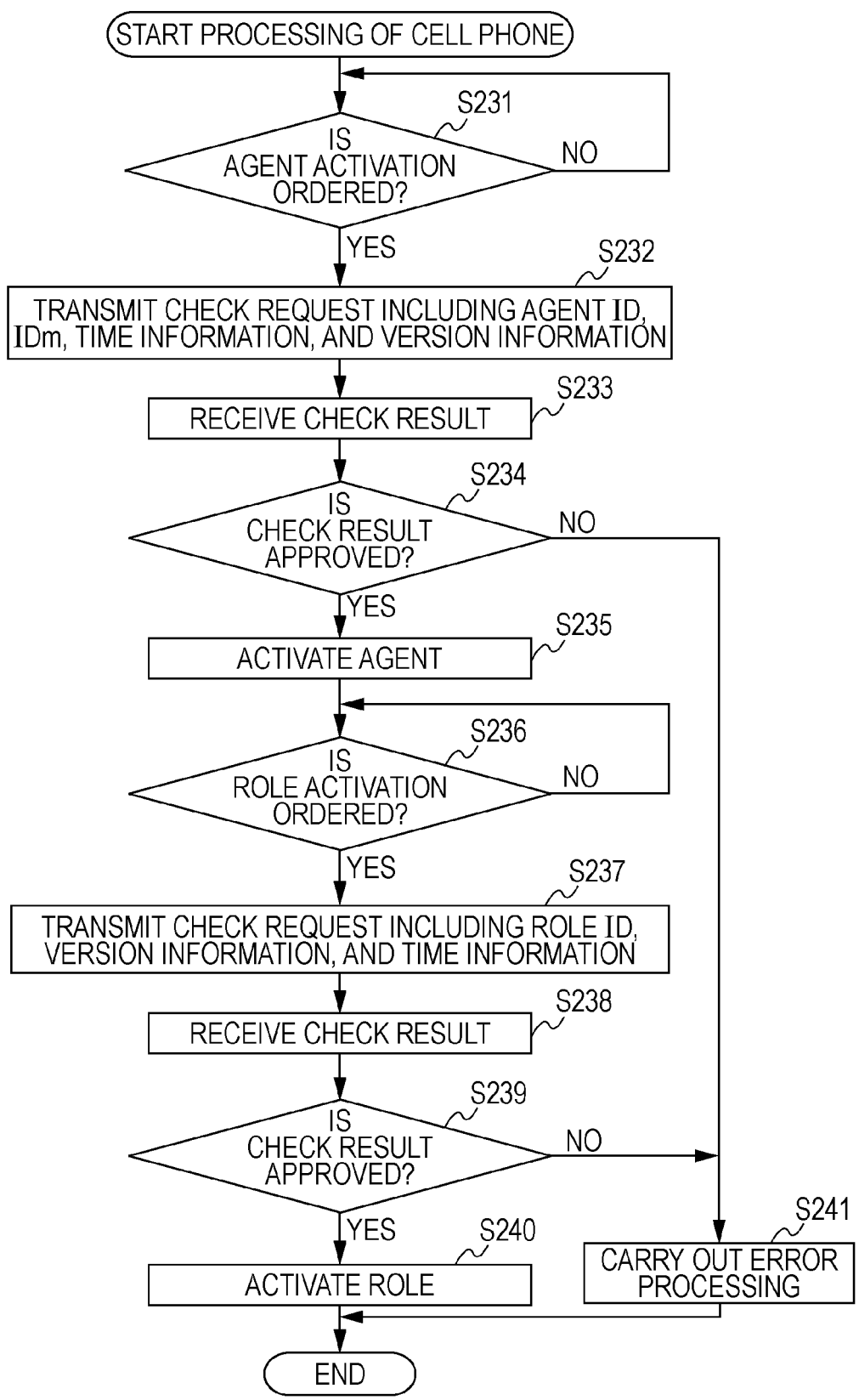
FIG. 11 is a flow chart that illustrates an example of processing of a cell phone.

The information transmitted by the processing in step S255 or step S256 is received by the cell phone 60 in step S233 shown in FIG. 11.

In this way, the processing of agent activation can be performed.

Figure 12:
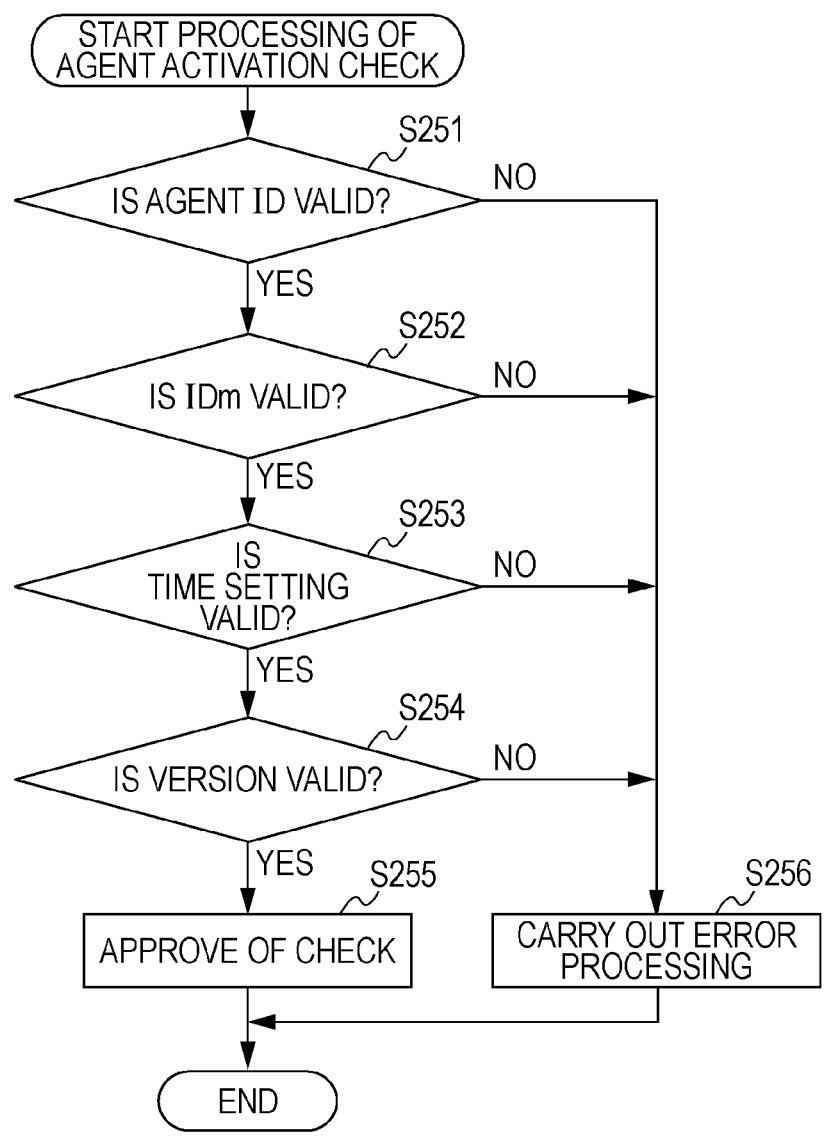
FIG. 12 is flow chart that illustrates an example of processing of agent activation check.

When the activation of the agent is allowed after the process shown in FIG. 12, the user of the cell phone 60 is allowed to activate the role. In this case, the check processing can be performed by the role server 72. Here, the user of the cell phone 60 where two or more roles have been downloaded may select a role of interest from them and activate the selected role.

Figure 13:
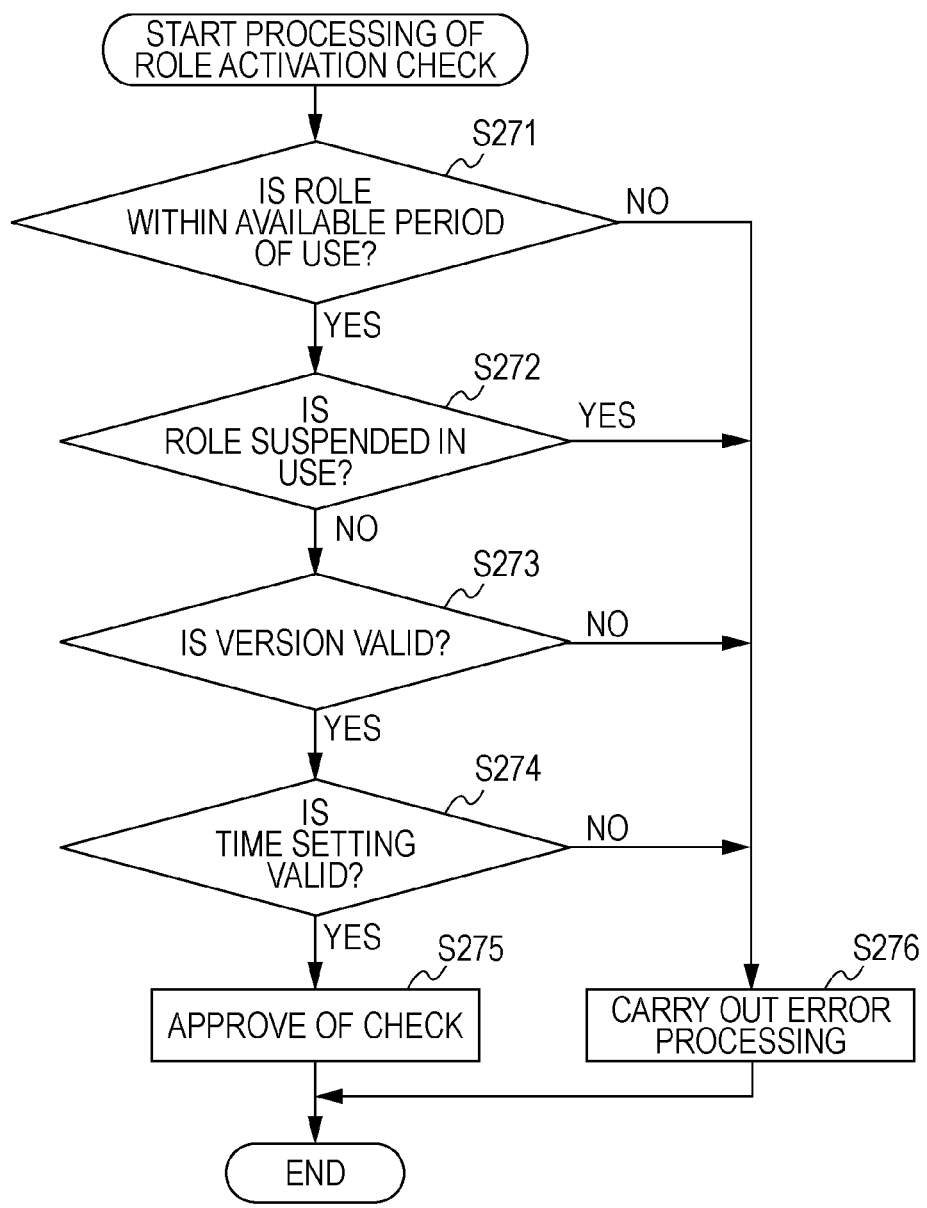
FIG. 13 is flow chart that illustrates an example of processing of role activation check.

Referring now to the flow chart of FIG. 13, the processing of role activation check will be described. Here, the processing is the predetermined check-processing performed at the time of activating the role. For activating the role, this processing is carried out by the role server 72 that receives the data of check request transmitted from the cell phone 60 by the processing in step S237.

In step S271, the role server 72 determines whether the expiration date of the role is within the available period of use. At this time, for example, the available period of use is checked based on the role ID in the data transmitted from the cell phone 60. The information about the available period of use is one in which the information about the starting date of use and the end date thereof of the role corresponding to the role ID are described. The information is stored in the predetermined storage area of the role server 72 in advance. Furthermore, for example, the information about the available period of use may be previously set by the service provider and registered in the role server 72.

In Step S271, it is determined whether the current time is in the available period of the role corresponding to the role ID.

In step S271, if it is determined that the current time is in the available period of the role, then the process proceeds to step S272. In step S271, on the other hand, if it is determined that the current time is out of the available period of the role, then the process proceeds to step S276.

In step 272, the role server 72 determines that the role is, suspended in use. At this time, for example, the information about suspended use is checked out based on the role ID in the data transmitted from the phone cell 60. For example, the information about suspended use is provided for preventing the role from being activated even if it is within the available period of use. The service provider may set the information about suspended use, followed by registering the information in the role server 72.

If it is determined that the role is not suspended in step S272, then the process proceeds to step S273. On the other hand, if it is determined that the role is suspended in use, then the process proceeds to step S276.

In step S273, the role server 72 determines whether the version is valid. At this time, for example, the role's version information in the data transmitted from the cell phone 60 is checked to determine whether the version is valid.

If it is determined that the version is valid in step S273, then the process proceeds to step S274. On the other hand, if it is determined that the version is invalid in step S273, then the process proceeds to step S276.

In step S274, the role server 72 determines whether the time setting is valid. Here, like the processing in step S253 in FIG. 12, it is confirmed whether the time setting of the cell phone 60 is incorrect.

If it is determined that the time setting is valid in step S274, then the process proceeds to step S275. On the other hand, if it is determined that the time setting is invalid in step S272, then the process proceeds to step S276.

In step S275, the role server 72 transmits the information representing the check's result "OK" to the cell phone 60. The cell phone 60 that has received the information is allowed to activate the role.

On the other hand, if the process proceeds to step S276, the activation of the role is not allowed. In step S276, the role server 72 performs the error processing. At this time, for example, the role server 72 generates data for displaying a notice that the activation of the role is not allowed on the browser of the cell phone 60.

The information transmitted by the processing in step S275 or step S276 is received by the cell phone 60 in step S238 shown in FIG. 11.

In this way, the processing of role activation can be performed.

Referring now to FIGS. 14 to 18, description will be made for examples of the images displayed on the display of the cell phone 60 when used as a reader/writer. Here, the examples will be described from the state after activating the agent of the cell phone 60. In other word, the process will be described from the state of completing the step S235 of FIG. 11. In the process which has been described with reference to FIG. 8, for example, two roles, role A and role B, are previously downloaded on the cell phone 60.

Figure 14:
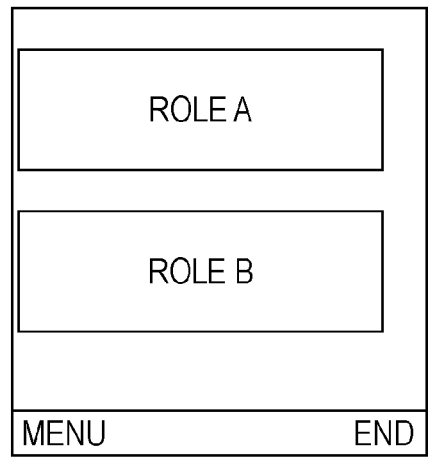
FIG. 14 is a diagram illustrating an exemplary screen displayed on the display of a cell phone when used as a reader/writer.

If the sent of the cell phone 60 is activated, as shown in FIG. 14, then the cell phone 60 displays a role-selection screen on the display thereof. In the example shown in the figure, both the role A and the role B are represented as selectable roles. For example, the role A is one provided for processing an item stored as a coupon and the role B is one provided for processing an item stored as an admission ticket of a concert. In this example, the user (in this case, for example, one member of the service provider) selects the role B.

For example, if the role B is selected in step S236 in FIG. 11, then it is determined that the activation of the role is ordered. After completing the processing in step S240, a screen, such as one represented in FIG. 15, is displayed on the display of the cell phone 60.

Figure 15:
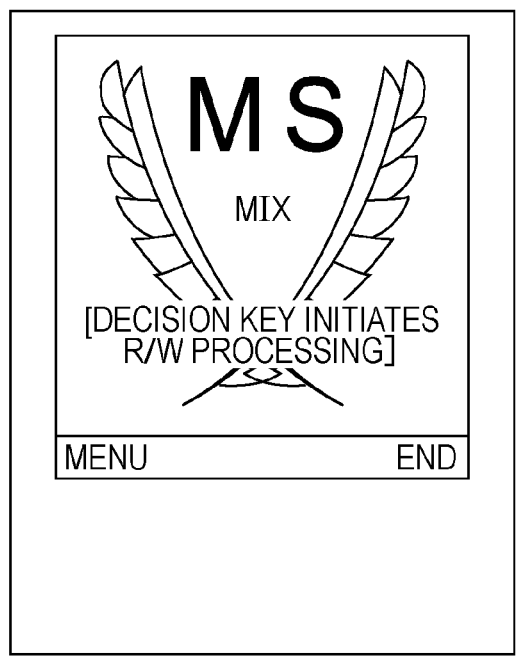
FIG. 15 is a diagram illustrating an exemplary screen displayed on the display of a cell phone when used as a reader/writer.

FIG. 15 is a diagram illustrating an example of an initial screen of the role B that acts as a reader/writer for processing a concert ticket.

In this example, the characters of "MIX SUPER", which is the name of the performer of the concert is represented together with the logo type thereof and the phrase "Decision key initiates R/W processing" is displayed. When the user depresses the decision key while the screen of FIG. 15 is displayed, a screen such as one displayed on the cell phone 60 as shown in FIG. 16 is displayed on the display of the cell phone 60.

Figure 16:
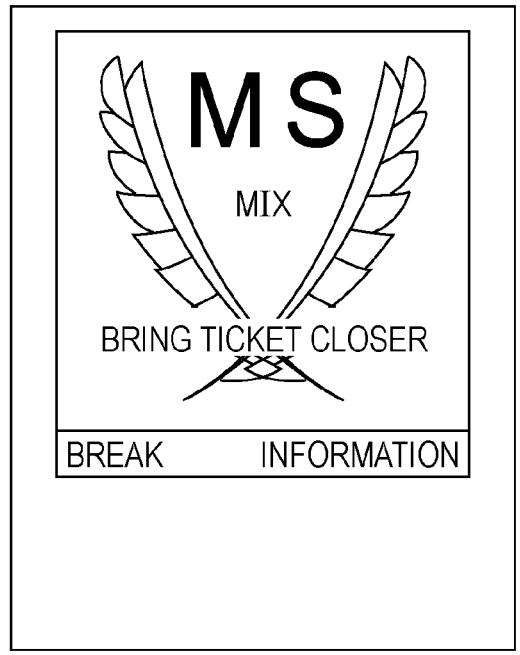
FIG. 16 is a diagram illustrating an exemplary screen displayed on the display of a cell phone when used as a reader/writer.

In a screen shown in FIG. 16, just as in the case with FIG. 15, the name of the performer of the concert is displayed as well as the logotype thereof. In addition, the screen shown in FIG. 16 displays the message "Bring your ticket closer", which is different from FIG. 15.

Figure 17:
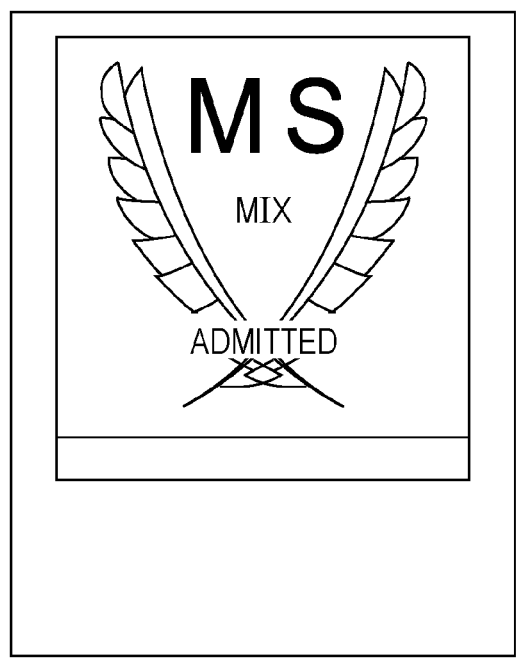
FIG. 17 is a diagram illustrating an exemplary screen displayed on the display of a cell phone when used as a reader/writer.

Under the state of displaying the screen shown in FIG. 16, if the cell phone 20 that stores an item as an admission ticket (ticket) is brought close to the cell phone 60, a screen as shown in FIG. 17 is displayed on the display of the cell phone 60. At this time, the IC chip of the cell phone 60 serves as a reader/writer and reads out the item stored in the IC chip of the cell phone 20 to confirm the validity of the item.

In the screen shown in FIG. 17, just as in the case with FIG. 16, the name of the performer of the concert is displayed as well as the logotype thereof. In addition, unlike the case of FIG. 16, the screen of FIG. 17 represents the message "Admitted". At this time, the IC chip of the cell phone 60 serves as a reader/writer and, for example, updates the date stored in the predetermined storage area of the IC chip of the cell phone 20 to void the ticket item stored in the IC chip of the cell phone 20.

Figure 18:
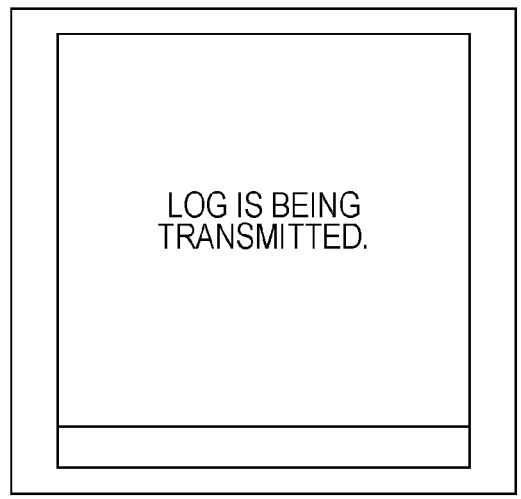
FIG. 18 is a diagram illustrating an exemplary screen displayed on the display of a cell phone when used as a reader/writer.

If the user depresses the decision key of the cell phone 60 under the state of displaying the screen of FIG. 17, the screen represented on FIG. 18 is displayed on the display of the cell phone 60. In this example, the message "Log is being transmitted." is displayed. Such a message allows the user to recognize that the log about the processing of the item stored in the IC chip of the cell phone 20 is being transmitted.

After completing the log transmission, the display of the cell phone 60 displays the screen as shown in FIG. 16 again.

Therefore, in the reader/writer providing system 2 according to the embodiment, a reader/writer which can be operated depending on items can be provided without developing and installing any software for reader/writer terminal on a case-by-case basis.

In other words, according to the embodiment, it is not necessary to prepare a dedicated hardware as a reader/writer terminal. By providing the cell phone 60 with the predetermined IC chip, the cell phone 60 can be used as a reader/writer.

According to the embodiment, furthermore, the selection of an appropriate role allows the cell phone 60 to be used as a reader/writer which can operate depending on the item.

In other words, there is a role including script data that specifies the contents of the item processing, the displayed images, output sounds, and so on during the processing. Thus, an agent which is one kind of application software of the cell phone 60 can operate depending on the description of the role. According to such a configuration of the embodiment, software that provides a function of the standard part of the reader/writer (for example, reading, writing, and operation at error) is provided in advance and customized by the role where appropriate.

Therefore, for example, even if a service provider is not well versed in knowledge about a reader/writer or an IC chip, the reader/writer is easily customizable by preparing a script which describes the desired operation may be prepared as a role in advance.

Here, a series of the aforementioned processes can be performed by hardware or by software. For carrying out a series of the aforementioned processes, a program that constitutes the software may be incorporated in a dedicated hardware of a computer. Alternatively, the program may be installed on a general-purpose personal computer 70 such as one shown in FIG. 19 via the network or a recording medium, where the computer 700 can execute various kinds of functions by installing various kinds of programs.

FIG. 19 is a block diagram schematically illustrating the configuration of the personal computer 700 according to the embodiment of the present invention.

In this figure, a central processing unit (CPU) 701 is able to carry out various kinds of processing according to a program stored in a read only memory (ROM) 702 or a program loaded in a random access memory (RAM) 703.

The RAM 703 may suitably store data for allowing the CPU 701 to perform a various kinds of processing.

The CPU 701, ROM 702, and RAM 703 are connected to one another through a bus 704. The bus 704 is also connected to an I/O interface 70.

The I/O interface 705 is connected to an input section 706, an output section 707, a storage section 708, and a communication section 709. The input section 705 includes a keyboard, a mouse, and so on. The output section 707 includes a speaker or the like. The storage section 708 includes a hard disk or the like. The communication section 709 includes a modem and a network interface card such as a LAN card. The communication section 709 performs communication processing through the network including the Internet.

A drive 710 may be connected to the I/O interface 705 if necessary. The drive 710 may be suitably equipped with a removal medium 711, such as a magnetic disk, an optical disk, a magneto-optic disk, or a semiconductor memory. A computer program read from any of them may be installed on the storage section 708 if necessary.

For carrying out a series of the processes described above using software, a program that forms the software may be installed from the network, such as the Internet, or a recording medium, such as a removal medium 711.

Here, examples of the recording medium, which stores a program in order to distribute the program apart from the main body of the device shown in FIG. 19, includes: a magnetic disk (such as a floppy disk (registered trademark)); an optical disk, such as a CD-ROM (Compact Disc-Read Only Memory) or a DVD (Digital Versatile Disc)); a magneto-optic disk, such as MD (Mini-Disk) (registered trademark); or a removal medium 711, such as a semiconductor memory. Alternatively, the recording medium may be a ROM 702, a hard disk placed in the storage section 708, or the like, where a program to be distributed to the user is stored in the state of being previously incorporated into the main body of the device.

The exemplary configuration of the general personal computer has been described with reference to FIG. 19. Such a configuration may be also applied to the cell phone 60, the agent server 71, the role server 72, the log server 74, or the like.

Furthermore, a series of the processes as described herein includes procedures performed one by one with time in the order of description. Alternatively, the procedures may not be unavoidably performed in chronological order. The procedures may be parallely or independently performed.

Furthermore, the embodiments of the present invention are not limited to those described above. It should be understood by those skilled in the art that various modifications may occur without departing from the gist of the present invention.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims. spirit and scope of the present subject matter and without diminishing its intended advantages. It is therefore intended that such changes and modifications be covered by the appended claims.

The invention is claimed as follows:

1. A communication device, comprising:
    an IC chip storing information in a predetermined area and functioning as a reader/writer that reads out or writes information stored in another IC chip;
    means for downloading an agent from an information processing device via a network, where said agent is provided as an application software operating said IC chip as a reader/writer; and
    means for downloading a role from said information processing device via the network using said agent downloaded therefrom, where said role is provided as script data in which at least part of a processing of said reader/writer is performed by said agent.

2. The communication device according to claim 1, further comprising:
    means for acquiring URL provided for accessing said information processing device to download said role, wherein
    said URL includes parameters described therein and used in processing of determining whether said information processing device allows said communication device to download said role.

3. The communication device according to claim 2, further comprising:
    means for transmitting a request for acquiring a role-download activation page to said information processing device based on said URL, wherein
    on the basis of information included in said request for acquiring said role-download activation page, a GUI screen is displaced based on display data of said role-download activation page transmitted from said information processing device when said information processing device allows said communication device to download said role, and
    said agent is activated to allow said means for downloading said role to download said role when a link in said GUI screen is operated.

4. The communication device according to claim 1, wherein
    said means for downloading said role downloads a plurality of roles, a role selected by a user from said plurality of roles is activated together with the activation of said agent to allow said IC chip to perform processing of said reader/writer.

5. The communication device according to claim 1, further comprising:
    means for activating said agent, when said agent is activated to allow said IC chip to perform said processing of said reader/writer, transmitting predetermined check information to said information processing device connected to said network and activating said agent based on a check result transmitted from said information processing device; and, means for activating said agent, when said role is activated to allow said IC chip to perform said processing of said reader/writer, transmitting predetermined check information to said information processing device connected to said network and activating said role based on a check result transmitted from said information processing device.

6. The communication device according to claim 5, wherein said predetermined check information to be transmitted to said information processing device by said means for activating said agent includes an identification number particular to said IC chip.

7. The communication device according to claim 1, wherein said IC chip is functioned as a reader/writer that performs reading or writing of information stored in another IC chip placed in another communication device.

8. A non-transitory computer readable storage medium storing a computer program for allowing an apparatus connected to a network to function as a communication device, the computer program causing the apparatus to:

store information in a predetermined area of an IC chip and cause the IC chip to function as a reader/writer that reads out or writes information stored in another IC chip;

download an agent from an information processing device via the network, where said agent is provided as an application software operating said IC chip as a reader/writer; and download a role from said information processing device via the network by activating said agent downloaded therefrom, where said role is provided as script data in which at least part of a processing of said reader/writer is performed by said agent.

9. An information processing device, comprising:

means for transmitting a role-download activation page, which transmits, via a network, display data of said role-download activation page to a communication device on the basis of a request for acquiring said role-download activation page transmitted through the network from said communication device, where said communication device has an IC chip storing information in a predetermined area and functioning as a reader/writer that reads out or writes information stored in another IC chip and operates said IC chip as said reader/writer based on a role provided as script data in which at least part of a processing of said reader/writer is described; and means for transmitting said role to said communication device via the network when receiving an access from said communication device based on a link in said role-download activation page.

10. The information processing apparatus according to claim 9, wherein said request for acquiring said role-download activation page is transmitted based on URL previously acquired by said communication device to download said role, and said means for transmitting said role-download activation page generates a download key and transmits said display data of said role-download activation page including said download key when said communication device is allowed to download said role based on the description of a parameter in said URL.

11. The information processing apparatus according to claim 10, wherein said means for transmitting said role, when receiving an access from said communication device based on a link in said role-download activation page, transmits said role to said communication device on condition that it is determined that said communication device is allowed to download said role based on predetermined check information transmitted from said communication device.

12. The information processing apparatus according to claim 11, wherein said predetermined check information transmitted from said communication device includes:

agent identification information provided as an application software that allows said IC chip to be functioned as a reader/writer in said communication device; and said download key.

13. The communication device according to claim 9, further comprising:

means for transmitting an agent check result, when activating said agent to allow said IC chip to perform processing of said reader/writer by said IC chip, generating a check result that represents whether said communication device is allowed to activate said agent and transmits said check result to said communication device based on predetermined check information transmitted from said communication device; and means for transmitting a role check result, when activating said role to allow said IC chip to perform processing of said reader/writer by said IC chip, generating a check result that represents whether said communication device is allowed to activate said role and transmits said check result to said communication device based on predetermined check information transmitted from said communication device.

14. The communication device according to claim 13, further comprising:

said means for transmitting said agent check result determines whether said communication device is allowed to activate said agent based on said identification number peculiar to said IC chip in said predetermined check information.

15. A non-transitory computer readable storage medium storing a computer program for allowing an apparatus connected to a network to function as an information processing device, the computer program causing the apparatus to:

transmit, via the network, display data of a role-download activation page to a communication device on the basis of a request for acquiring said role-download activation page transmitted through the network from said communication device, where said communication device has an IC chip storing information in a predetermined area and functioning as a reader/writer that reads out or writes information stored in another IC chip and operates said IC chip as said reader/writer based on a role provided as script data in which at least part of a processing of said reader/writer is described; and transmit, via the network, said role to said communication device when receiving an access from said communication device based on a link in said role-download activation page.

16. A reader/writer providing system, comprising:

a communication device including an IC chip storing information in a predetermined area and functioning as a reader/writer that reads out or writes information stored in another IC chip, means for downloading an agent from an information processing device via a network, where said agent is provided as an application software operating said IC chip as a reader/writer, and means for downloading a role from said information processing device via the network using said agent downloaded therefrom, where said role is provided as script data in which at least part of a processing of said reader/writer is performed by said agent; and said information processing device including means for transmitting a role-download activation page, which transmits, via the network, display data of said role-download activation page to a communication device on the basis of a request for acquiring said role-download activation page transmitted through the network from said communication device, and means for transmitting said role to said communication device via the network when receiving an access from said communication device based on a link in said role-download activation page.

17. A communication device, comprising:

an IC chip storing information in a predetermined area and functioning as a reader/writer that reads out or writes information stored in another IC chip;

a unit for downloading an agent from an information processing device via a network, where said agent is provided as an application software operating said IC chip as a reader/writer; and a unit for downloading a role from said information processing device via the network using said agent downloaded therefrom, where said role is provided as script data in which at least part of a processing of said reader/writer is performed by said agent.

18. An information processing device, comprising:

a unit for transmitting a role-download activation page, which transmits, via a network, display data of said role-download activation page to a communication device on the basis of a request for acquiring said role-download activation page transmitted through the network from said communication device, where said communication device has an IC chip storing information in a predetermined area and functioning as a reader/writer that reads out or writes information stored in another IC chip and operates said IC chip as said reader/writer based on a role provided as script data in which at least part of a processing of said reader/writer is described; and a unit for transmitting said role to said communication device via the network when receiving an access from said communication device based on a link in said role-download activation page.

19. A reader/writer providing system, comprising:

a communication device including an IC chip storing information in a predetermined area and functioning as a reader/writer that reads out or writes information stored in another IC chip, a unit for downloading an agent from an information processing device via a network, where said agent is provided as an application software operating said IC chip as a reader/writer, and a unit for downloading a role from said information processing device via the network using said agent downloaded therefrom, where said role is provided as script data in which at least part of a processing of said reader/writer is performed by said agent; and said information processing device including a unit for transmitting a role-download activation page, which transmits, via the network, display data of said role-download activation page to a communication device on the basis of a request for acquiring said role-download activation page transmitted through the network from said communication device, and a unit for transmitting said role to said communication device via the network when receiving an access from said communication device based on a link in said role-download activation page.

* * * * *